UNITED STATES PATENT OFFICE.

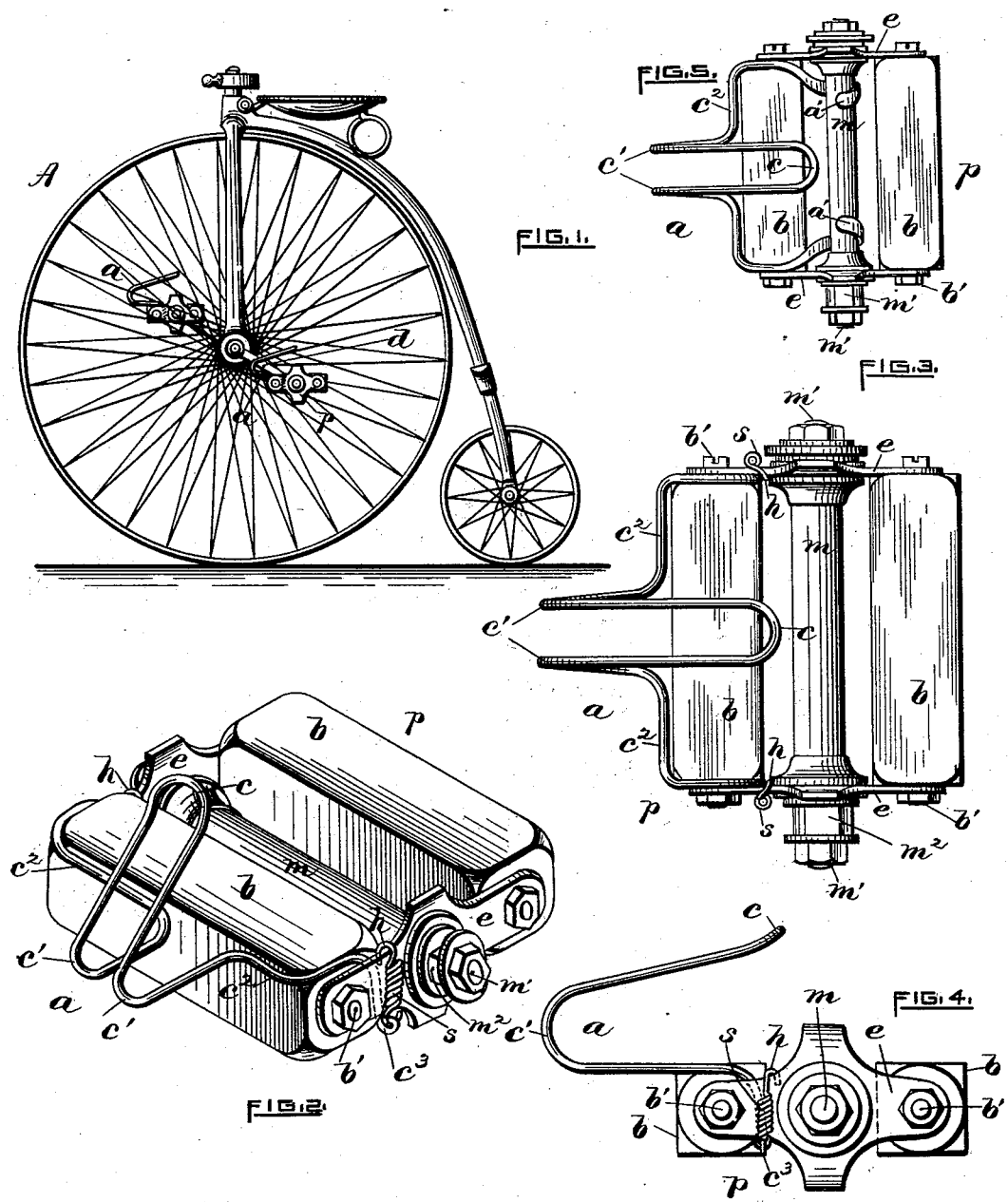

WILLIAM G. RANKIN, OF PROVIDENCE, RHODE ISLAND, ASSIGNOR OF ONE-HALF TO B. TAYLOR BRUCE, OF SAME PLACE.

TOE-CLIP FOR BICYCLE-PEDALS.

SPECIFICATION forming part of Letters Patent No. 425,697, dated April 15, 1890.

Application filed December 6, 1889. Serial No. 332,810. (No model.)

*To all whom it may concern:*

Be it known that I, WILLIAM G. RANKIN, a citizen of the United States, residing at Providence, in the county of Providence and State of Rhode Island, have invented certain new and useful Improvements in Toe-Clips for Bicycle-Pedals; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to bicycle-pedals; and it consists, essentially, of a piece of wire or metal bent to receive the toe of a boot and adapted to be readily attached to a bicycle-pedal.

The object of my invention is to provide bicycle-riders with means adapted to prevent the feet from slipping off of the pedals, the device permitting the feet to be readily applied to or removed from the pedals when desired, as in mounting and dismounting. By the use of my "toe-clip" or guard the rider's feet are more securely retained in position thereby, when used on an "ordinary" bicycle, to a great extent preventing the rider from being accidentally unseated and "taking a header" in consequence.

Another advantage of my invention is that as the feet are so securely placed upon the pedals the rider is enabled to travel with "hands off" the bar with greater facility than heretofore.

In the accompanying sheet of drawings, Figure 1 is a side elevation of an ordinary bicycle provided with my invention—i. e., a toe-clip attached to and extending from the forward side of the pedals. Fig. 2 is a perspective view, enlarged, of a pedal detached, as provided with the toe-clip, the drawing representing the right pedal. Fig. 3 is a plan view of the same. Fig. 4 is an end view, and Fig. 5 is also a plan view, showing a modification of the manner of attaching the toe-clip to the pedal.

The following is a more detailed description of my invention, including the manner of its construction and mode of operation.

A, referring to the drawings, designates an ordinary bicycle of usual construction. The pedals $p$ are secured to the cranks $d$ and swivel thereon, as usual. In the drawings the pedals each have two sides $e$, made of metal, and two rubber blocks $b$, interposed between the sides and secured thereto by bolts $b'$, passing through the whole. A sleeve or hollow stay $m$ is rigidly secured to both side frames $e$, through which a steel pin $m'$ loosely passes, a portion $m^2$ of the pin at one end being flattened and adapted to receive and be firmly secured to the crank $d$, as common.

$a$ designates the toe-clip as a whole, the same being preferably made of round steel wire, although flat wire or narrow strips of metal may be employed for the purpose. A piece of wire of suitable length is taken and bent, say, at the middle $c$, to form two sides or parts, which extend forward a short distance, (see Figs. 3 and 4,) when both are bent at $c'$, the sides then extending rearwardly nearly to the forward rubber $b$. They are next bent laterally to form sides $c^2$, which extend in front of and parallel with but below the face of the rubber, to the ends thereof. Each portion of the wire is then again bent, so as to extend transversely across and rest upon the corresponding end of the rubber block and adjacent to the inner face of the side frame. The ends of the wire are finally bent downwardly, terminating in shouldered ends $c^3$, adapted to connect with short spiral springs $s$. The latter in turn extend upwardly from the ends $c^3$ outside of the frames $e$, and terminate in hooks $h$, which hook over the upper edge of the frame. In lieu of the springs $s$ the ends of the clip may be flattened and bent substantially as shown at $a'$, Fig. 5, wherein the wire passes under and is hooked around the hollow stay $m$.

The clip is applied to the pedal as follows: The two end portions of the clip are first sprung between the two sides $e$ of the pedal. The shoulders $c^3$, bearing against the lower edges of the sides, (see Fig. 2,) then catch the springs $s$ on the upper edges of the sides, placing the hooks $h$ as far away from the rubber as possible, so that in case the rubber turns the hooks will not become displaced.

It will be seen by reference to the drawings that in use the rider's foot may rest fairly upon the rubber b, as usual, and not upon the clip, the base portion of the latter being somewhat below the face of the rubber blocks. The clip prevents the foot from slipping forward, and at the same time assists the rider in placing and maintaining his foot in proper position. The device is equally applicable and advantageous to other types of cycles—as, for example, tandems, safeties, and tricycles. The clip in nowise prevents the rider from readily mounting and dismounting. In case the rider does not wish to use the clips at any time, they need not be removed, but simply turn the pedals over one-half a revolution, thus presenting the other faces.

I do not broadly claim as new a bicycle having pedals provided with a guard or shield; but What I do claim as my invention is—

1. The toe-clip hereinbefore described, formed of a piece of wire bent to receive the toe portion of a boot and also bent to engage the end portions of the forward rubber of a bicycle-pedal, and means for attaching the clip to the pedal.

2. The combination, with a bicycle-pedal provided with rubbers b b or other analogous supports for the foot, of the toe-clip or guard a, resting upon but below the face of the forward rubber b, and having the ends of the clip enlarged to form shoulders bearing against the lower edge of the pedal-frame e, and springs for maintaining the shoulders in contact with said frame, substantially as hereinbefore described.

3. In a bicycle or other analogous vehicle, the combination, with the operating-pedals, of a metallic toe-clip detachably secured to each pedal and extending from the forward side thereof to receive the toe portion of the rider's boot, and having the lower portion of the clip extending below the face of the pedal, so that the pressure of the foot is wholly borne by the rubbers of the pedal, substantially as hereinbefore described.

In testimony whereof I have affixed my signature in presence of two witnesses.

WILLIAM G. RANKIN.

Witnesses:
CHARLES HANNIGAN,
ALBERT W. DAKIN.